United States Patent [19]

Nadkarni et al.

[11] Patent Number: 5,060,889

[45] Date of Patent: Oct. 29, 1991

[54] APPARATUS AND METHODS FOR MAINTAINING AIRCRAFT TRACK ANGLE DURING AN ASYMMETRIC FLIGHT CONDITION

[75] Inventors: Arun A. Nadkarni, Kirkland; Mithra M. K. V. Sankrithi, Bellevue, both of Wash.

[73] Assignee: The Boeing Company, Seattle, Wash.

[21] Appl. No.: 346,436

[22] Filed: May 1, 1989

[51] Int. Cl.⁵ .................... B64C 13/04; G05D 1/12
[52] U.S. Cl. ................................. 244/183; 244/184; 364/428
[58] Field of Search ............. 244/183, 184, 185, 76 R, 244/179, 194, 195, 196, 197, 81; 364/432, 428

[56] References Cited

U.S. PATENT DOCUMENTS

| | | | |
|---|---|---|---|
| 2,597,020 | 5/1952 | Nissen | 244/76 R |
| 2,827,250 | 3/1958 | Rusler | 244/179 |
| 2,954,944 | 10/1960 | Huet | 244/76 R |
| 2,987,276 | 6/1961 | Osder et al. | 244/184 |
| 3,031,158 | 4/1962 | Gille | 244/179 |
| 3,160,367 | 12/1964 | Lecarme | 244/76 R |
| 3,361,392 | 1/1968 | Doniger et al. | 244/184 |
| 3,399,850 | 9/1968 | Kramer et al. | 244/184 |
| 3,761,691 | 9/1973 | Schultz et al. | 244/184 |
| 3,815,850 | 6/1974 | Tribuno et al. | 244/196 |
| 4,006,870 | 2/1977 | Boone et al. | 244/184 |
| 4,094,479 | 6/1978 | Kennedy | 244/179 |
| 4,143,839 | 3/1979 | Antonov et al. | 244/76 R |
| 4,482,961 | 11/1984 | Kilner et al. | 244/183 |

OTHER PUBLICATIONS

*Aviation Week & Space Technology*, Jun. 29, 1987, "Boeing Evaluation New Control Laws in J7J Advanced Technology Simulator", pp. 54–59.

*Primary Examiner*—Michael J. Carone
*Attorney, Agent, or Firm*—R. H. Sproule; B. A. Donahue

[57] ABSTRACT

When an aircraft is operating in an asymmetrical flight condition, such as during a landing decrab maneuver or during inflight engine out, the pilot is normally required to make precise compensatory roll control inputs to keep the aircraft moving along its original track angle. The pilot is relieved of this compensatory roll control task by providing a control system which automatically banks the aircraft to maintain the flight of the aircraft along the selected track angle while in the asymmetrical flight condition. Further adjustments in the bank angle of the aircraft are made automatically by a track angle feedback control system so that the aircraft remains on the selected track angle even when subject to external disturbances such as crosswind gusts and shear.

63 Claims, 5 Drawing Sheets

APPARATUS AND METHODS FOR MAINTAINING AIRCRAFT TRACK ANGLE DURING AN ASYMMETRIC FLIGHT CONDITION

TECHNICAL FIELD

The present invention relates to a control system for maintaining aircraft track angle during an asymmetric flight condition such as exists during a crosswind landing when the aircraft is decrabbed to align it with the runway, or during an asymmetrical thrust condition when an engine has failed.

BACKGROUND OF THE INVENTION

In a conventional crosswind landing approach, the pilot places the aircraft in a "crabbed" configuration wherein the aircraft is headed to the left or right of the runway and into the wind in order to maintain a track along the runway centerline. At a selected altitude above the runway, the pilot adds sufficient rudder (decrab) to swing the longitudinal axis of the aircraft into alignment with the runway in preparation for landing touchdown and rollout. At the same time, the pilot banks the aircraft into the wind sufficiently to maintain the desired ground track in alignment with the runway. This decrab maneuver is one of the more demanding control tasks for pilots of current generation aircraft, and it requires carefully coordinated "crossed controls" i.e., opposing control wheel (or control stick) and rudder pedal inputs. While crosswind landings in a crab can be accomplished in light to moderate crosswinds with certain aircraft, a partial or full decrab maneuver is generally needed for landings in more severe crosswind conditions.

For autopilot controlled landing approaches (autoland approaches) where the pilot is not in the primary control loop, a number of automatic decrab control laws have been developed. For example, U.S. Pat. No. 2,987,276 to Osder discloses an autoland decrab system which uses instrument landing system (localizer) information to decrab the aircraft and lower the windward wing to maintain the desired ground track in alignment with the runway centerline until landing touchdown.

A disadvantage of these autoland decrab systems is that in the event the autoland system malfunctions, the pilot is required to disengage the autopilot landing system and resume manual flight control. If the pilot elects to continue the landing, he is faced with having to manually perform the demanding decrab and flare control tasks.

Another patent discusses a limited pilot aid method for pilot-in-the-loop decrab control. In U.S Pat. No. 3,761,691 to Schultz et al there is provided a "flight director" type of roll steering command guidance which instructs the pilot as to how he should move his wheel/stick in order to hold track.

Another asymmetric flight condition of interest is an engine out condition on a multi-engine aircraft with noncenterline thrust. During this condition the aircraft will yaw to the right or left due to the asymmetric thrust and drag associated with the noncenterline engine failure. The yawing moment can be particularly severe and difficult to control for an engine failure in a high thrust flight condition such as takeoff climb or go-around. In order to reduce aircraft sideslip angle consequent to the engine failure, opposite rudder may be applied by the pilot. While the pilot may apply either opposite rudder or no rudder, he must apply a wheel/stick input to bank the aircraft with the good engine down in order to maintain aircraft flight along the original track angle.

SUMMARY OF THE INVENTION

In order to overcome the deficiencies of conventional systems and to reduce pilot workload for pilot-in-the loop control of asymmetric flight conditions such as landing decrab and engine-out, the present invention provides means for automatically moving the roll control surfaces of the aircraft, such as the ailerons and spoilers, in a manner to cause the aircraft to maintain flight along its original track angle, without the need for pilot wheel/stick control inputs. Thus, while the pilot may control sideslip angle with rudder pedal inputs, he is relieved of the necessity of making compensatory wheel/stick inputs to stay on his original track angle. In the present invention crossfeeds from a pilot rudder pedal input and/or an engine-out compensation rudder signal are provided to the roll control surfaces. In order to compensate for external perturbations such as winds, gusts and wind shear, long-term closed loop control of track angle provides roll axis control.

BRIEF DESCRIPTION OF THE DRAWINGS

The present invention will be described in greater detail by referring to the drawings in conjunction with the following detailed description, in which.

DETAILED DESCRIPTION

In an exemplary embodiment of the present invention there is provided a controller which automatically holds the track angle of an aircraft when the aircraft is in an asymmetric flight condition, such as during a crosswind landing decrab maneuver or during an engine out condition when there is asymmetrical thrust being generated. During a crosswind landing, for example, when the pilot deflects the rudder pedals to perform a decrab maneuver, the ailerons are automatically repositioned (opposite aileron) to maintain the aircraft on its original track angle, e.g. aligned with the runway centerline. A major portion of the aileron correction needed to maintain aircraft track angle is provided as a function of the amount of deflection of the rudder pedals through an "open-loop" crossfeed, while smaller, updated corrections are provided by a closed loop automatic track angle hold function of the controller.

Figure 1:
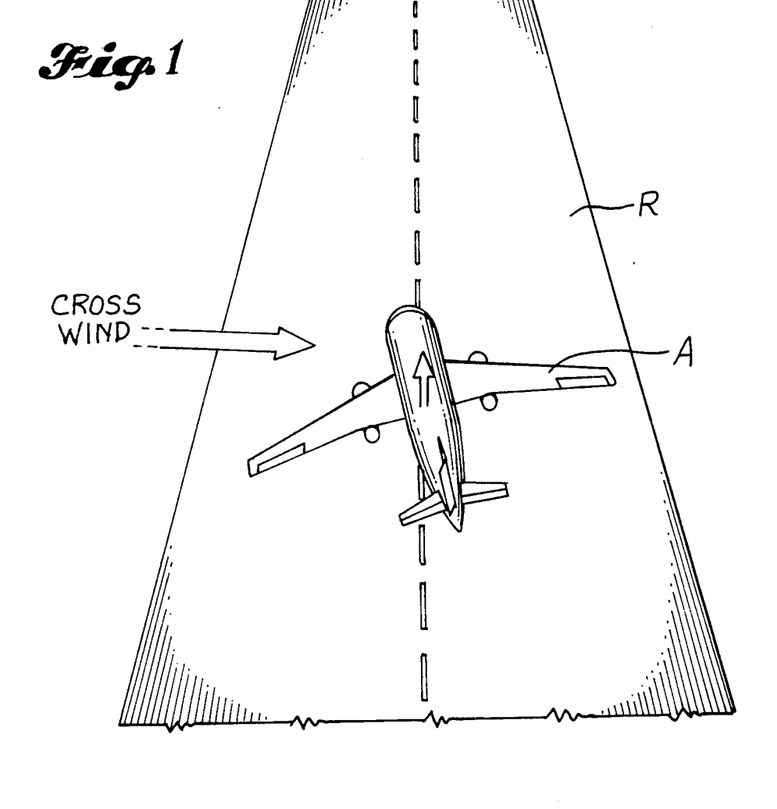
FIG. 1 is a pictorial view of an aircraft approaching a runway in a crabbed position.
Figure 2:
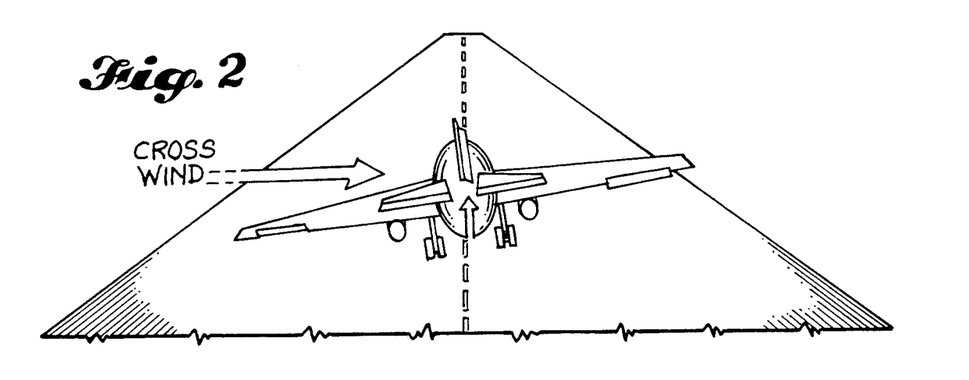
FIG. 2 is a pictorial view of an aircraft in a decrab position with the windward wing down to maintain an aircraft track which is aligned with the runway.

For example, there is shown in FIG. 1 an aircraft A approaching a runway R in the presence of a crosswind which blows from left to right across the runway. In order to maintain an aircraft track which is aligned with the centerline of the runway, the aircraft is headed to the left of the runway centerline. Prior to touchdown on the runway, the pilot may make a right rudder pedal input to align the longitudinal axis of the aircraft with the runway centerline. When this happens, the controller of the present invention automatically rolls the aircraft to a left wing down attitude by an amount which is a function of the rudder pedal deflection as illustrated in FIG. 2. This will roughly maintain the aircraft on a desired track which is in alignment with the runway centerline. Prior to touching down on the runway, the aircraft may be subject to minor perturbations, such as changes in wind speed or direction, which can affect the track of the aircraft. In an exemplary embodiment, the controller of the present invention has an automatic track angle hold function which operates the aircraft roll control surfaces (e.g., ailerons, spoilers) to change the bank angle of the aircraft in a manner to maintain the aircraft along the desired track in alignment with the runway centerline. In the present application the terms "roll angle" and "bank angle" will be used interchangeably.

Figure 3:
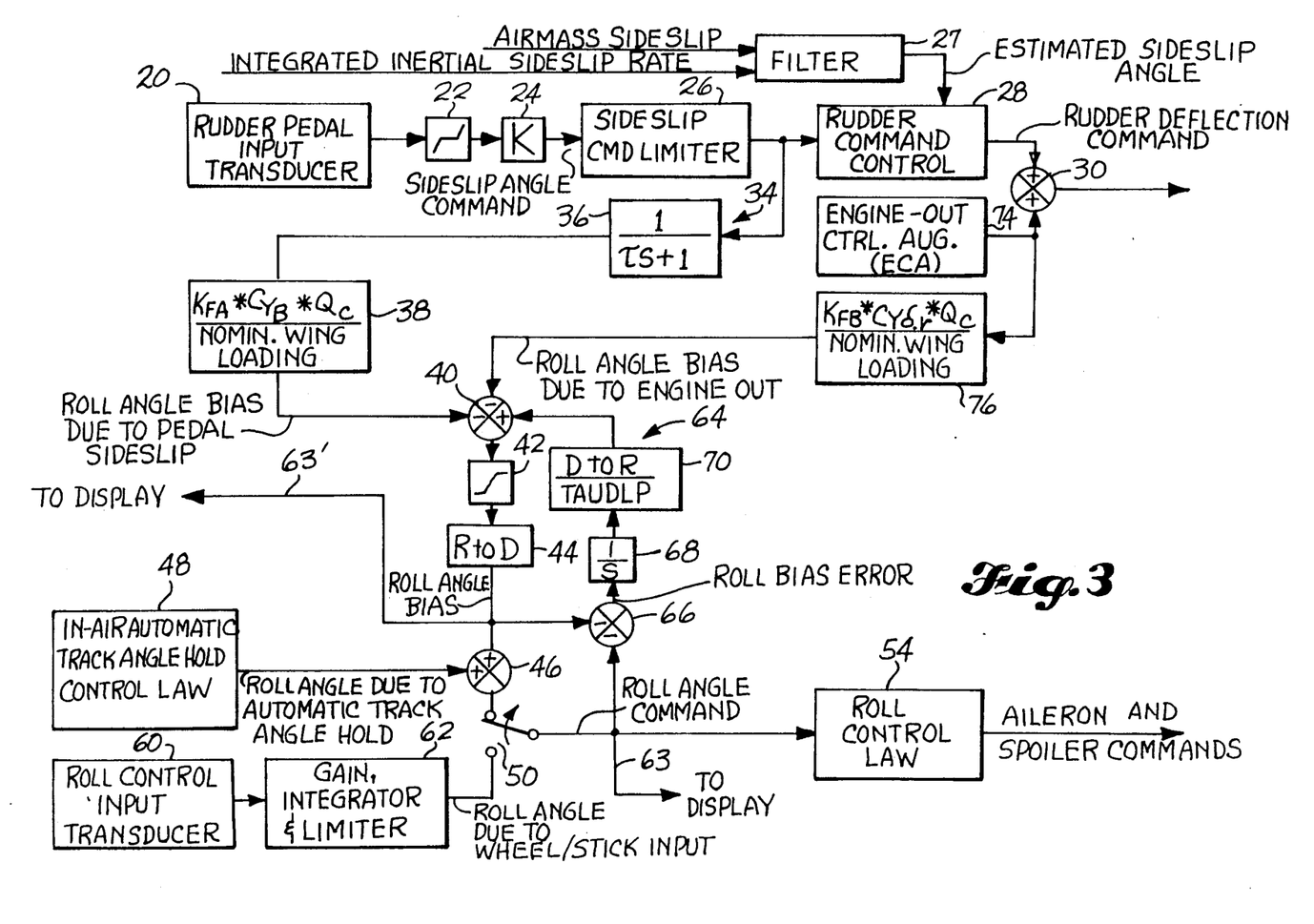
FIG. 3 is a block diagram of a lateral/directional control system having a track angle hold subsystem for maintaining inflight track angle when an aircraft is operating in an asymmetrical flight condition.

Referring to FIG. 3, the controller of the present embodiment is described in greater detail when implemented in conjunction with a lateral/directional control system in the aircraft. When the pilot deflects the rudder pedals to align the longitudinal axis of the aircraft with the aircraft ground track, a signal which is a function of rudder pedal position or rudder pedal force is generated by a rudder pedal input transducer 20. This signal is passed through a neutral position deadzone 22 and then gain adjusted in a conventional manner by a gain multiplier, designated by the number 24, to generate a sideslip angle command which is Proportional to the amount (or force) of the rudder pedal deflection. Sideslip angle is defined as an angle formed between a longitudinal axis of the aircraft and the aircraft's true airspeed velocity vector. The sideslip angle command is maintained within safe limits by a limiter 26. Feedback control is used to match the airplane's actual sideslip angle with the sideslip angle command using a sideslip angle estimate as a feedback signal. This estimate is provided from a complementary filter 27 which blends a signal indicative of airmass sideslip with the integral of a signal indicative of inertial sideslip rate, with the former dominating in the long term and the latter dominating in the short term. A further description of the complementary filter 27 to estimate sideslip angle is set forth in application Ser. No. 276,834 entitled "Aircraft Rudder Command System" filed Nov. 23, 1988; the contents of which are incorporated herein by reference. De-emphasis of the airmass sideslip in the short term is beneficial in reducing gust-induced fin loads and in improving lateral ride quality in turbulence. The signal indicative of airmass sideslip may be a measured sideslip from a sideslip vane or differential static pressure sensor, or a derived sideslip computed from rudder deflection, lateral acceleration, and aerodynamic side force derivatives due to rudder deflection and sideslip. A sideslip error signal is then generated. This signal is converted to a rudder deflection command in a conventional manner by a control block 28 which typically will incorporate proportional and integral command paths. The integral path will move the rudder as required to drive sideslip error to zero in the steady state. The rudder deflection command is fed downstream through an adder 30 and then further downstream to the rudder actuators.

In order to perform the track angle hold function of the present invention, a crossfeed path indicated at 34 is provided from the output of the limited sideslip angle command block 26. The limited sideslip angle command is fed through a conventional lag filter 36 and a gain multiplier, designated by the number 38, to generate a roll angle bias signal (due to pedal induced sideslip) for applying opposite aileron to maintain the aircraft on its original track angle. The roll angle bias is a function of the sideslip angle command. In order to generate the roll angle bias signal, the gain multiplier 38 adjusts the gain as a function of the side force coefficient on the aircraft due to the sideslip angle ($C_{y\beta}$), as well as the impact pressure ($Q_c$), and the wing loading ($W_f$). More specifically, the roll angle bias $R_b$ = the sideslip angle command multiplied by the term ($K*C_{y\beta}*Q_c/W_f$), where K is an empirical constant, $Q_c$ is a conventional output from an aircraft air data computer (not shown), and $W_f$ is a wing loading term which may be a constant which is calculated as a function of the average aircraft weight, or which may be a variable term based on estimated aircraft weight obtained from an on-board weight and balance system. The side force coefficient due to sideslip angle ($C_{y\beta}$) is a parameter based on wind-tunnel or flight test aerodynamic data, and may be scheduled in a conventional manner as a function of airplane configuration (such as flaps and landing gear configuration) and Mach number. Downstream of the gain block 38, the signal is fed to a subtractor 40, and then further downstream through an authority limit block 42 and an R-to-D block 44 which functions to change the signal from units of radians to units of degrees.

As mentioned previously, additional corrections in aircraft bank angle during asymmetric flight may be necessary to maintain the desired flight track angle in the presence of external disturbances. Accurate automatic tracking during the asymmetric flight condition is accomplished by summing at an adder 46 the aforementioned roll angle bias signal due to pedal induced sideslip (from the gain multiplier 38) with a roll angle signal due to an in-air automatic track angle control law generated at a block 48. The in-air automatic track hold control law which will be described briefly hereinafter, is described in greater detail in Applicants' copending application entitled "Apparatus and Method for Automatically Maintaining Aircraft Track" filed the same date as the present application. That application is assigned to the assignee of the present invention and is incorporated herein by reference.

In order to initiate this automatic track angle hold function, at least two conditions must be true at the same time. These conditions require that 1) a roll angle command (to be described hereinafter) be within a selected threshold, e.g. plus or minus 2.5 degrees of an estimated roll angle required to hold track angle (roll angle bias), and 2) the control wheel/stick be neutralized within a selected deadzone. When the above conditions are met, the actual or filtered track angle of the aircraft existing at the time that the control wheel is neutralized is automatically maintained. The term "filtered track angle" defines a track angle sensor signal (e.g. from an inertial reference system of the aircraft) which is passed through a smoothing filter such as a first order lag filter. By the term "neutralized" it is meant to define positions in which the control wheel is not deflected out of its centered detent by manual inputs from the pilot.

Referring to the exemplary crosswind landing described with reference to FIGS. 1 and 2, when the aircraft is in the crabbed position, the roll angle commanded by the pilot is wings level, and the aircraft track angle is aligned with the runway centerline. With the addition of rudder during the decrab maneuver, the aircraft is rolled automatically into the direction of the crosswind as described previously; however, the roll angle commanded by the pilot does not change. In this manner, the automatic track angle hold operates to maintain the aircraft in alignment with the runway centerline.

The roll angle signal due to the automatic track hold is generated at block 48 in the following manner. When there is no rudder pedal input and the control wheel is neutralized, and, in addition, the aircraft roll angle command is within 2.5 degrees of the estimated roll angle required for track hold (i.e., within 2.5 degrees of the value of the roll angle bias signal), the actual or filtered track angle of the aircraft existing at the time of control wheel neutralization is automatically maintained. This automatic track angle control continues until the pilot's roll controller, e.g. control wheel, is moved again from the neutral position.

In the present embodiment, a roll angle signal from the automatic track angle controller 48 is summed with the roll angle bias signal at the adder 46 to generate the roll angle command signal. In order to operate in the automatic track angle hold mode, a switch 50, which is tied to the adder 46, is moved to an "up" position shown in FIG. 3. In this manner, the roll angle command signal from the adder 46 is fed to a roll control block 54 which generates a signal for positioning the ailerons/spoilers. This positioning signal is typically generated by using proportional and integral command paths from a roll angle error signal. The roll angle error signal is obtained by subtracting a roll angle feedback signal from the roll angle command.

In an exemplary embodiment, track angle hold is engaged (switch 50 in the up position) when the pilot's roll controller (control wheel/stick) is in its centered detent and either i) track angle hold was engaged on the previous computational time frame (the term "computational time frame" referring to the previous computation of the present track angle hold control law by a general purpose digital computer which is used to implement the control law), or ii) the magnitude of the difference between the roll angle command signal and the roll angle bias signal (which is the estimated roll angle required for track hold) is less than a selected threshold value (nominally 2.5 degrees).

When track angle hold is not engaged, switch 50 is in the "down" position. In this case the roll angle command is generated from a roll rate signal which is output from a roll control input transducer 60 connected to the aircraft wheel/stick roll controls, and which is conventionally gain adjusted, integrated and limited at a block 62.

The operation of the present embodiment in conjunction with aforementioned yaw and roll control laws can be further described with reference to FIG. 3. As a pilot starts a crosswind landing approach in a crabbed, wings-level trim configuration with no roll controller or rudder pedal inputs, the roll angle command and roll angle bias signals are both zero and switch 50 is in the up position (because track angle hold is engaged). If crosswind gusts or wind shear disturb the aircraft's track angle, the in-air automatic track angle hold control block 48 generates roll angle commands as needed to restore the track angle to match the track angle command and thereby hold track angle substantially constant.

The system in FIG. 3 provides two distinct control subsystems for generating the required roll angle to maintain the aircraft's original track angle. As discussed previously, the first control subsystem is the crossfeed from the limited sideslip angle command to generate the roll angle bias due to pedal induced sideslip. The second subsystem is the continued use of the in-air automatic track angle hold control law even after the pilot has made his pedal inputs. The first subsystem has the advantages of greater simplicity and quicker response because it starts generating roll angle bias signals before a track angle error has started to build up. The second subsystem has the advantage of precision since it uses closed-loop control of track angle. A preferred manner of carrying out the invention combines both control subsystems for making the aircraft hold its track angle while the pilot commands a decrab maneuver with a rudder pedal input. Alternate modes of carrying out the invention may feature the use of either subsystem independently for substantially holding track angle during decrab or forward slip flight.

It should be emphasized that in the present invention the pilot need not make any roll controller inputs to hold track angle while decrabbing. This is a substantial improvement over conventional methods which require the pilot to make a precise roll input in opposition to his pedal input in order to stay on track.

In the present exemplary embodiment, the pilot may make small roll inputs as he desires, in which case the switch 50 moves to the down position when the pilot is making a nonzero roll input, and returns to the up position when the roll controller is re-centered and the roll angle command signal is within a certain threshold (nominally 2.5 degrees) of the roll angle bias signal. Preferably, both the roll angle command signal and the roll angle bias signals are displayed to the pilot, as shown by the separate signal paths 63, 63', to aid the pilot in knowing what bank angle is needed to maintain track angle hold.

When switch 50 is in the up position, the integrator at block 62 is synchronized to assure continuity of the roll angle command signal when switch 50 is moved to the down position. If this is not done, the control surface may be commanded to jump or step at the time of transition, thus Producing an undesirable jerk in the airplane dynamic response. One method of assuring a smooth transition is to have both control laws (roll angle due to wheel/stick input and roll angle due to automatic track angle hold) running all the time, but the the integrator in the not-in-command control law synchronized (or slaved) to the in-command control law. In this way, when control authority is transferred by the switch 50, the new in-command control law will have an initial output command which is synchronized with the final output command from the former in-command control law. Likewise, when switch 50 is in the down position, a roll angle command integrator in the automatic track angle hold control law 48 is synchronized to assure continuity of the roll angle command signal when switch 50 is moved to the up position.

In a further exemplary embodiment, an equalization branch indicated at 64 (FIG. 3) is provided in order to slowly change the roll angle bias so that it approaches and eventually equals the roll angle command signal whenever track angle hold is engaged (switch 50 is up). In this manner, the roll angle bias will be made equal to the roll angle command (in the long term steady state), and a zero command output will be generated from the automatic track angle controller 48.

The equalization branch 64 also provides a method for feeding the roll angle signal from the in-air automatic track angle hold control law 48 through the equalization loop to the roll angle bias display in the long term.

The equalization branch 64 includes a subtractor 66 which subtracts the roll angle bias signal from the roll angle command signal to generate a roll bias error signal. The roll bias error signal from the subtractor 66 is passed through an integrator 68 which is followed downstream by a units conversion block 70 for converting from degrees to radians and for dividing the converted value by an equalization time constant TAUDLP (seconds). The equalization signal output from block 70 is fed downstream to the subtractor 40 in order to sum the equalization signal into the roll angle bias signal. The integrator 68 will continue to modify the equalization signal and the roll angle bias signal until the input to integrator 68 (i.e. roll bias error) is driven to zero. When roll bias error is driven to zero, roll angle bias will be equalized to roll angle command. On the other hand, when switch 50 is in the down Position, the integrator 68 will be ramped to zero.

In a further exemplary embodiment shown in FIG. 3, there is an engine out control block 74 which uses a control law described in a U.S. patent application by M. S. McCuen, Ser. No. 07/231,208 filed Aug. 11, 1988 now U.S. Pat. No. 4,935,682 for "Full Authority Engine-Out Control Augmentation Subsystem". This application is assigned to the assignee of the present invention, and the contents of the application are incorporated herein by reference. The engine-out control law detects the occurrence of a noncenterline engine failure (e.g. by looking at the difference between left and right engine thrust signals), and applies an incremental command to a yaw control surface (rudder) to counter the yawing moment resulting from the noncenterline engine failure. Furthermore, the output of the control block 74 is summed with the aforementioned rudder command from block 28 at the summer 30 to generate a command signal for deflecting the rudder surface. However, this incremental rudder command results in the generation of a side force due to rudder deflection, which in turn causes the aircraft to deviate from its desired track angle. In the present embodiment, the output from control block 74 is crossfed through a gain block 76 wherein the gain is defined by the equation K * $C_{YB}$ * $Q_C/W_f$ where K is an empirical constant, $C_Y$ is the side force coefficient due to rudder deflection, $Q_C$ is the impact pressure, and $W_f$ is the wing loading. The output from the gain block 76, which is a roll angle bias signal to counter the sideforce generated by the ECA rudder command, is fed to the subtractor 40.

The present embodiment provides two subsystems for generating a roll angle command needed to hold the aircraft on its desired track angle during the time the rudder is deflected by the engine-out augmentation controller 74. The first subsystem is a crossfeed of the engine-out control augmentation (ECA) rudder signal. The second subsystem is the same in-air automatic track angle hold controller 48 discussed previously. The crossfeed signal has the advantages of greater simplicity and quicker response because it starts generating roll angle bias signals even before the track angle error has started to build up. The output from the in-air automatic track hold controller 48 has the advantage of precision because it uses closed loop control of track angle. An exemplary mode of carrying out the invention combines both subsystems in order to maintain the selected track angle while the ECA controller 74 functions to deflect the rudder in order to counter the yawing moment resulting from the noncenterline engine-out.

Figure 4:
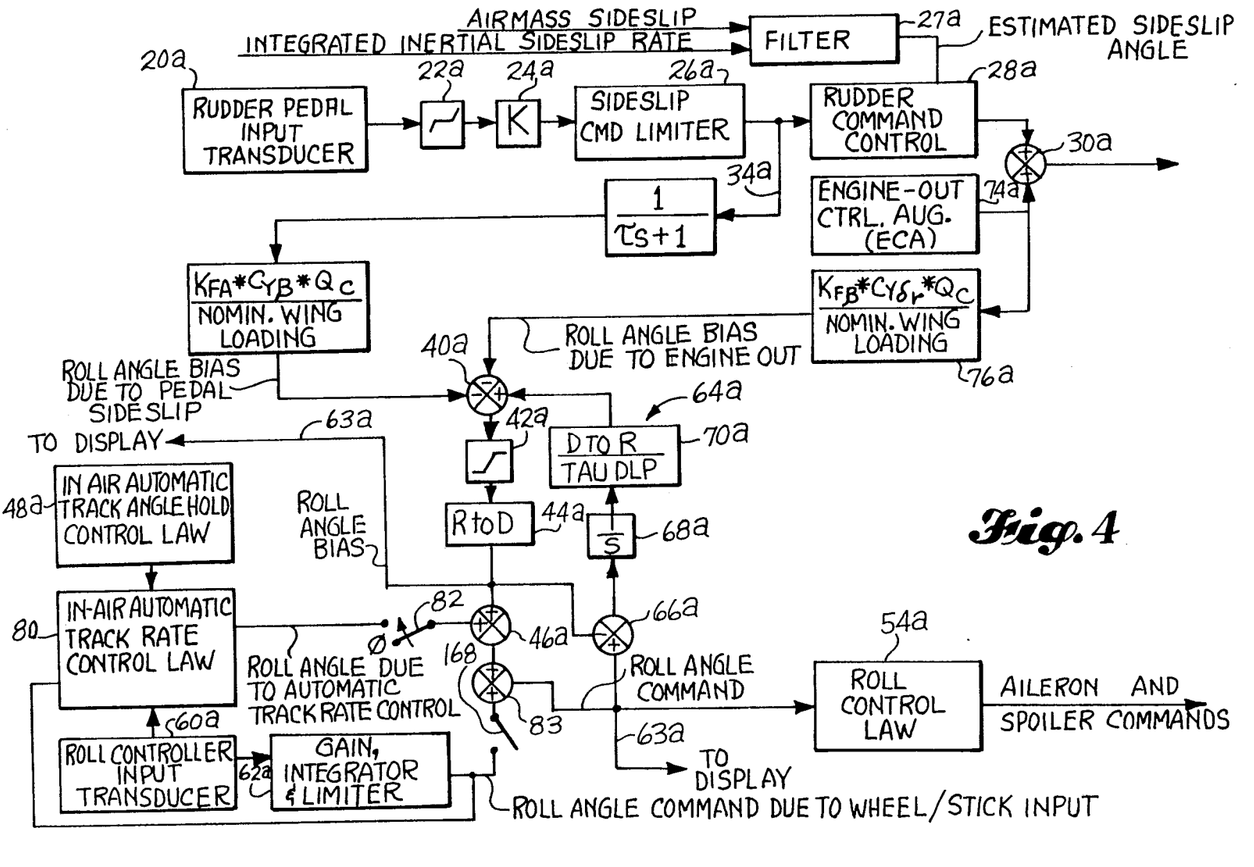
FIG. 4 is a block diagram of a control system similar to that of FIG. 3 which uses a track rate hold subsystem instead of the track angle hold subsystem.

Referring now to FIG. 4 there is shown another exemplary embodiment wherein like elements described in the previous embodiments are identified by like numerals with the suffix "a" attached. In the present exemplary embodiment, the in-air track angle hold control law at control block 48a is augmented by an in-air automatic track rate control law Provided at a control block 80. When the magnitude of the difference between the roll angle command signal and the roll angle bias signal is less than a threshold value (e.g. six degrees), the track rate hold function is engaged by movement of the switch 82 (FIG. 4) to the up position. The primary purpose of the automatic track rate controller 80 is to smoothly transition into and out of automatic track angle hold operation.

Figure 5:
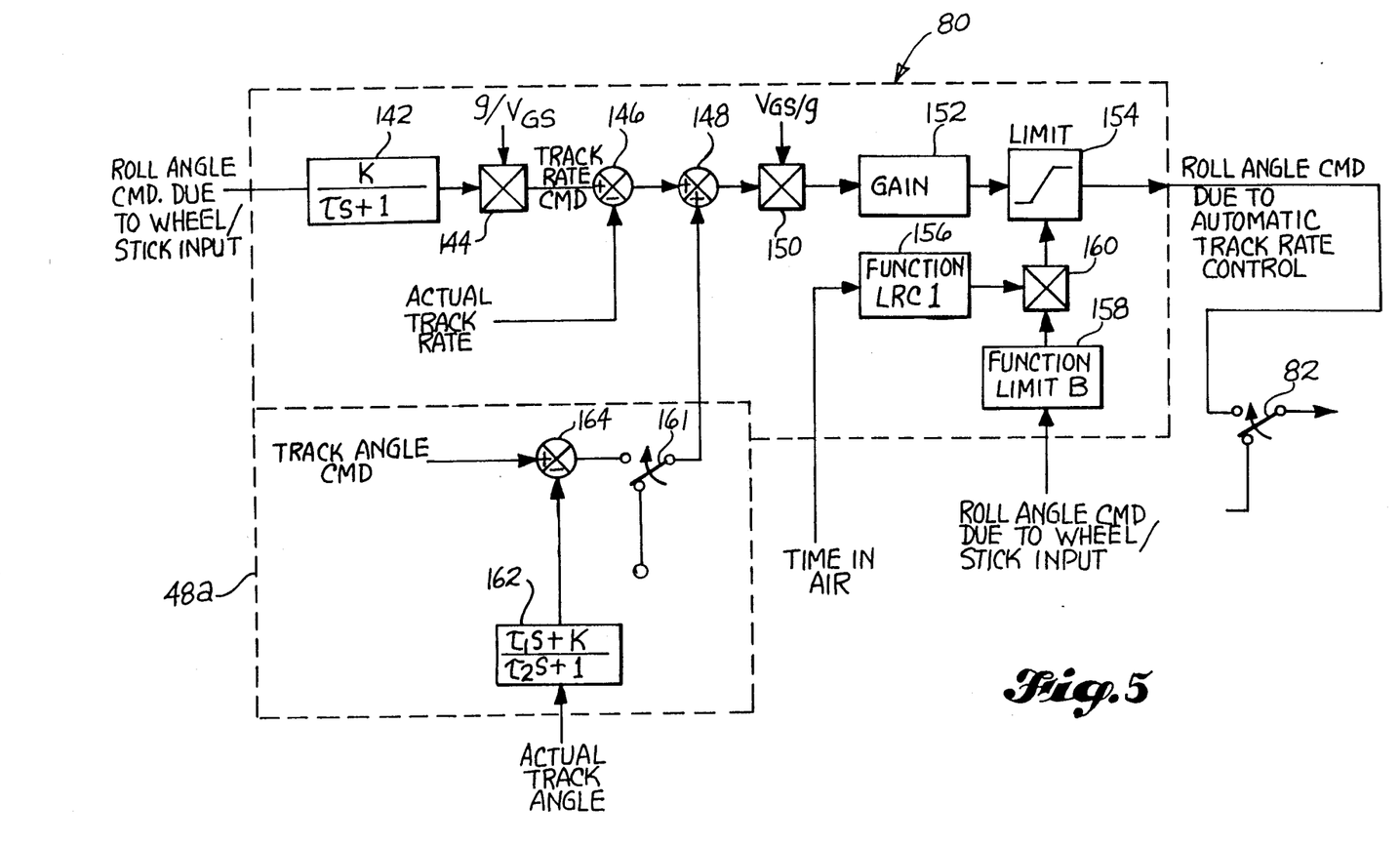
FIG. 5 is a block diagram of the track rate hold subsystem used in FIG. 4.

Operation of the in-air automatic track rate control law is described with reference to FIG. 5. A track rate command is synthesized by i) passing the roll angle command due to wheel/stick input through a gain and filter block 142 and ii) multiplying the resulting signal at a multiplier 144 by a ratio ($g/V_{gs}$) of the gravitational acceleration of the aircraft and the aircraft groundspeed obtained from the aircraft's inertial reference system. The theoretical basis for this formulation lies in the fact that track rate for an ideal coordinated turn in no wind conditions is equal to the product of roll angle and gravitational acceleration divided by aircraft groundspeed.

A signal representative of the actual track rate of the aircraft is then subtracted from the track rate command signal at a subtractor 146. The actual track rate signal may be obtained from a sensor or it may be a synthesized signal (e.g., track angle fed through a differentiator or washout filter). The track rate error signal from subtractor 146 is passed through a summer 148 and then on to a multiplier 150, where it is multiplied by a ratio ($V_{gs}/g$) of the aircraft groundspeed to the gravitational acceleration of the aircraft. In this embodiment, the effect of multiplier 150 is to cancel the effect of multiplier 144.

The control signal output from multiplier 150 is passed through an empirical gain factor block 152 to produce an estimated roll command modification signal needed to zero the track rate error signal. This estimated roll command modification signal is passed through a limiter 154 to produce a roll angle command due to automatic track rate hold, which in turn is fed via switch 82 to the summer 46a in FIG. 4.

The limit value enforced by limiter 154 is obtained by multiplying the outputs of a function block 156 (LRC1) and function block 158 (LIMIT B) at a multiplier 160. The Purpose of function LRC1 is to provide a gradual opening of the roll control authority given to the track rate hold function during the first several seconds of flight after takeoff. This assures a smooth and transient-free engagement of the automatic track rate hold control law as the airplane takes off in a crosswind. The operation of function block 156 is set forth in further detail in the following table.

| INPUT | OUTPUT |
| --- | --- |
| 0.0 | 0.0 |
| 2.8 | 0.0 |
| 4.0 | 0.125 |
| 7.0 or greater | 1.0 |

Note: Use linear interpolation between data points

On the other hand, the purpose of function LIMIT B is to provide a smooth and gradual increase in roll control authority given to the track rate hold function (and track angle hold function to be discussed below) as the roll angle command due to wheel/stick input decreases from six degrees to zero degrees (e.g. as the pilot rolls the airplane towards wings level). The operation of function LIMIT B block 158 is set forth in further detail in the following table.

| INPUT | OUTPUT |
| --- | --- |
| less than or equal to −6.0 | 0.0 |
| −3.0 | 2.0 |
| −2.0 | 3.0 |
| −1.0 | 5.0 |
| 0.0 | 6.0 |
| 1.0 | 5.0 |
| 2.0 | 3.0 |
| 3.0 | 2.0 |
| greater than or equal to 6.0 | 0.0 |

Note: Use linear interpolation between data points

When the magnitude of the difference between the roll angle command signal and roll angle bias signal becomes less than another smaller threshold (e.g., 2.5 degrees) and the pilot places his wheel/stick in its centered detent, then automatic track angle hold is engaged by movement of a switch 161 (FIG. 5) to the up position. In this manner, both the automatic track rate hold and automatic track angle hold are engaged at the same time. With switch 161 in the up position, a signal representing the actual track angle of the aircraft is passed through a lead/lag filter 162 and is subtracted at a subtractor 164 from a track angle command signal, to generate a track angle error signal. The purpose of the lead/lag filter 162 is to provide some anticipation and smoothing to the track angle signal. The track angle command signal is initialized so as to provide continuity of the roll angle command signal when track angle hold is first engaged. Preferably, the track angle command signal is synchronized with (i.e., set equal to) the output of filter 162 when switch 161 is down, and held at its last synchronized value when switch 161 is flipped up. This provides for transient free initialization of the track angle command signal.

A resulting track angle error signal is passed through the switch 161 to summer 148, where it is added to the track rate error signal. The net effect is to generate an incremental roll command which tends to hold both track angle and track rate constant. As mentioned previously, the output of control block 80 is tied through switch 82 to the summer 46a. In this manner, the roll angle bias signal is summed with the roll angle signal due to automatic track angle/rate hold. The use of track rate hold for intermediate bank angles (e.g. less than six degrees but greater than 2.5 degrees) may provide smoother transitions into and out of the automatic track angle hold mode (which engages at bank angles less than 2.5 degrees when the pilot roll controllers are in detent).

When switch 82 (FIG. 4) is in the down position, track rate hold is not engaged. In this manner, the automatic track rate/angle input through switch 82 is zero. In addition, a switch 168, which ties the output of block 62a to summer 83, is in the closed position in order to feed the roll angle command due to wheel/stick input to the summer 83. In this manner, the roll angle command signal is generated by summing the roll angle signal from gain/integrator/limiter block 62a with the roll angle bias signal at the adder 83. However, when switch 82 is in the up position and switch 161 (FIG. 5) moves to the up position, switch 168 moves to the open position so that the automatic track rate/angle hold signal reaches the summer 83 instead of the roll angle command due to wheel/stick input.

The continued use of the roll angle bias crossfeed when neither automatic track rate hold nor automatic track angle hold is engaged, has the advantage of consistent inputs being needed from the rudder pedals and from the ECA controller 74a on either side of and near the boundaries of track rate/angle hold engagement, and for straight vs. steady turning flight. More specifically, inputs from the rudder pedals or engine out controller will generate roll angle command signals in the same manner whether or not the automatic track angle/rate controller is engaged. This similarity of response is preferable because sometimes the pilot may not know whether track angle/rate hold is engaged or not (e.g. 2.4 vs. 2.6 degrees of bank). Even when the pilot knows that the track angle/rate hold is not engaged, such as during a steady turn at thirty degrees of bank, it is preferable to provide a consistent roll response to a pedal input or ECA controller output whether or not automatic track angle/rate hold is engaged. When the track angle hold function is disengaged (e.g. switch 168 is closed), the equalization branch 64a is disabled by ramping the integrator 68a to zero. At the time when automatic track angle hold is disengaged, the occurrence of a transient is prevented by initializing the roll angle command integrator (block 62a) so as to assure continuity of the final roll angle command.

Figure 6:
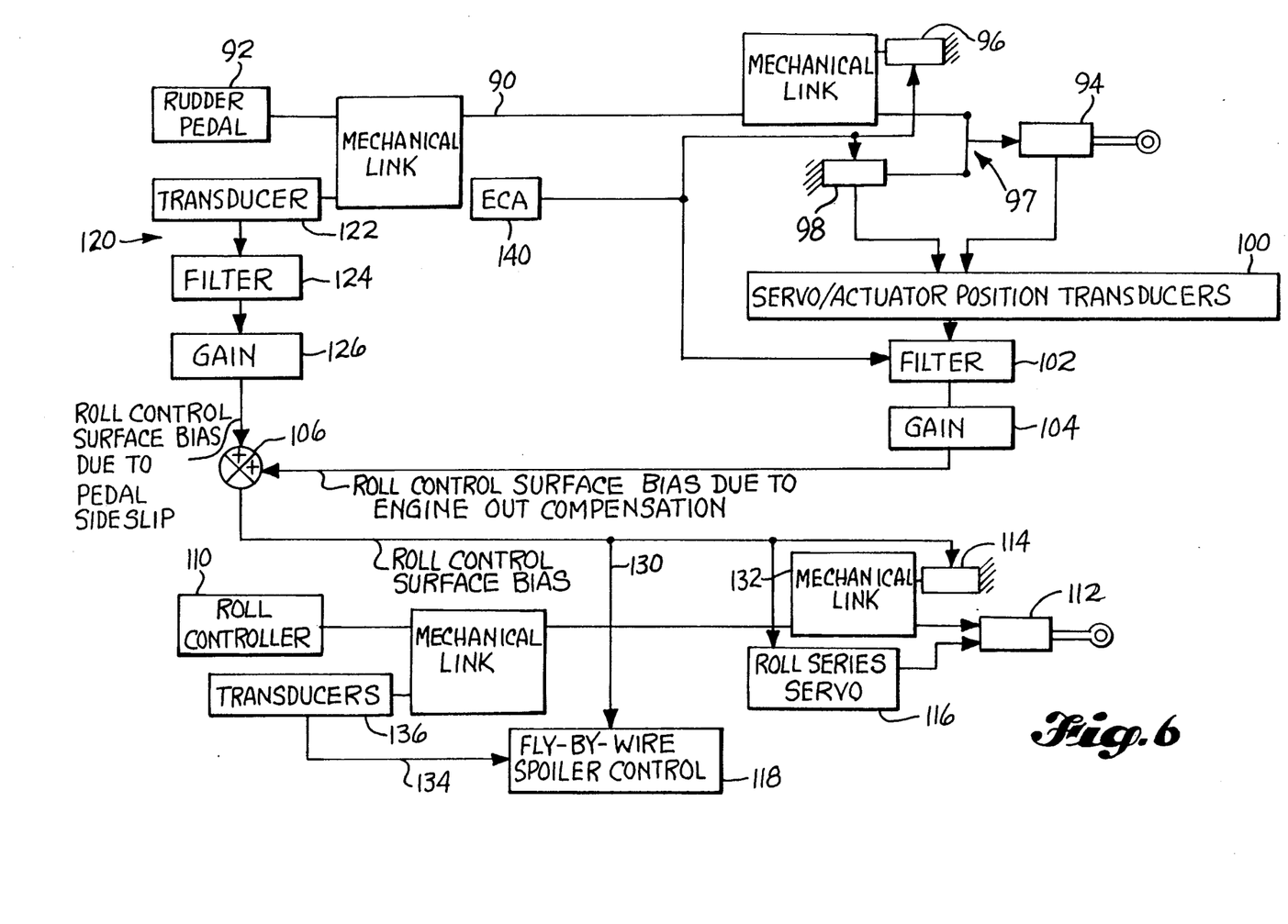
FIG. 6 is a block diagram of a conventional lateral directional/control system incorporating the track angle hold subsystem of the present invention

In FIG. 6 there is illustrated another exemplary automatic controller which is used in conjunction with a conventional (mechanical) primary flight control system instead of a flight control system which is operated by electrical signals (fly-by-wire) or by light signals (fly-by-light) as in the previous embodiments. There is shown in FIG. 6 a conventional yaw control system which includes a mechanical link, identified by the number 90, between the pilot's rudder pedals 92 and conventional rudder Power control actuators (PCAs) 94. A conventional rudder ratio changer is part of the mechanical link 90. Secondary servoactuators 96 are used for autoland rollout guidance ("parallel" servos), and secondary servoactuators 98 are used for yaw damping ("series" servos). The outputs from parallel servos 96 feed downstream to the PCAs 94 and back upstream to the pilot's rudder pedals through the mechanical link 90. On the other hand, the outputs from the series servos 96 feed only downstream to the PCAs 94 via a mechanical summer 97, and are "invisible" to the pilot through his rudder pedals 92. Conventional servoactuator/PCA position transducers 100 produce actuator position signals, which may be transmitted through a filter 102 and gain block 104 to a downstream adder 106. This provides a crossfeed from the yaw axis to the roll axis which can aid the aircraft in holding its track angle when a rudder deflection is made.

Also shown in FIG. 6 is a conventional roll control system including a mechanical link between the aircraft's roll controller 110 (typically a wheel or stick) and PCAs 112 which operate ailerons on both wings of the aircraft. The outputs from conventional parallel autopilot servos 114 provide control inputs to the PCAs 112 from the aircraft autopilot (not shown). Also connected to the aileron PCAs 112 are series roll servos 116. A conventional fly-by-wire spoiler control system 118 is shown, but not described, in the illustrated embodiment of FIG. 6. An electrical path 134 is provided for feeding signals from roll controller transducers 136 to the fly-by-wire spoiler control 118. The invention may be applicable to several variations of the conventional control system shown.

The present embodiment provides a controller for automatically commanding the roll control surfaces (e.g. ailerons) to move in such a manner so as to cause the aircraft to maintain its track angle while the aircraft is in an asymmetric flight condition during a decrab maneuver or engine out condition. The automatic controller includes a crossfeed path, indicated at 120, from the rudder pedals 92 via a transducer 122, filter 124, and gain stage 126. Gain stage 126 generates a roll control surface bias signal due to Pedal induced sideslip in a manner similar to the manner by which gain block 38 generated a roll angle bias signal described with reference to FIG. 3. The roll control surface bias signal due to pedal is fed through the adder 106. The resulting roll control surface bias signal is fed downstream to the fly-by-wire spoiler control 118 via a path 130, to the series roll servo 116 via a path 132, and/or to the autopilot parallel servos 114.

An engine-out control augmentation (ECA) controller may be provided to generate rudder commands for countering any yawing moment arising from a noncenterline engine-out condition. More specifically, the ECA controller includes a control block 140 which functions in the same manner as the control block 74 of FIG. 3. The signal output from the control block 140 has paths leading to the servos 96 and/or 98, as well as a crossfeed through the filter 102 and to the gain block 104 for generating a roll control surface bias signal due to operation in an engine out condition. Gain block 104 functions in a similar manner to gain block 76 described with reference to FIG. 3. This provides automatic control for commanding the roll control surfaces to move in such a manner as to cause the aircraft to maintain its track angle, while the engine-out compensation control counters the yawing moment resulting from a noncenterline engine failure.

Additional embodiments are possible for other variations in the primary control system, e.g. mechanical control on one axis and fly-by-wire control on the other axis. Therefore, while certain exemplary embodiments of the invention have been described in detail, it should be understood that further variations and modifications can be made within the spirit and scope of the invention as defined in the appended claims.

What is claimed is:

1. An aircraft track angle hold control system comprising:
   a. roll control surfaces capable of generating a rolling moment on the aircraft in flight;
   b. yaw control means for permitting a pilot to command the aircraft to assume a nonzero sideslip condition through a rudder pedal input wherein the yaw control means includes a maneuver command control system which interprets the rudder pedal input as a sideslip angle command and which uses feedback control means to position a yaw control surface of the aircraft in such manner as to cause an actual sideslip angle of the aircraft to follow the sideslip angle command; and
   c. automatic control means, responsive to a nonzero pilot rudder pedal input, for commanding the roll control surfaces to move in such manner as to cause the aircraft's track angle to hold at a substantially constant value while the pilot makes no roll controller input.

2. The aircraft track angle hold control system of claim 1 wherein the roll control surfaces include at least one aileron.

3. The aircraft track angle hold control system of claim 1 wherein the roll control surfaces include at least one spoiler panel.

4. The aircraft track angle hold control system of claim 1 wherein the yaw control means comprises mechanical control means for the pilot to position a yaw control surface through the rudder pedal input.

5. The aircraft track angle hold control system of claim 4 wherein the yaw control surface is a rudder.

6. The aircraft track angle hold control system of claim 1 additionally comprising roll-axis maneuver command control means for causing the aircraft's actual bank angle to a least approximately follow a bank angle command, and wherein the automatic control means comprises a command crossfeed from the sideslip angle command to a roll angle bias summing into the bank angle command.

7. The aircraft track angle hold control system of claim 6 wherein deflection of at least one of pilot's roll axis controllers produces a roll rate command which is integrated to generate the bank angle command.

8. The aircraft track angle hold control system of claim 7 wherein the command crossfeed is used only when the pilot's roll axis controllers are in a centered detent.

9. The aircraft track angle hold control system of claim 7 wherein the command crossfeed is used regardless of whether the pilot's roll axis controllers are in a centered detent.

10. The aircraft track angle hold control system of claim 6 wherein the automatic control means further includes a closed-loop track angle hold feedback control law using track angle as a feedback signal, the closed-loop track angle hold feedback control law generating an additional, incremental component to the roll angle command bias summing into the bank angle command.

11. The aircraft track angle hold control system of claim 6 further comprising means for driving the roll angle command bias towards equalling the bank angle command in the steady state.

12. The aircraft track angle hold control system of claim 6 additionally including means for displaying the bank angle command and the roll angle command bias to the pilot.

13. The aircraft track angle hold control system of claim 6 wherein the roll angle command bias is authority limited.

14. The aircraft track angle hold control system of claim 6 wherein the command crossfeed includes a lag filter.

15. The aircraft track angle hold control system of claim 6 wherein the command crossfeed includes a gain value which is directly proportional to the aircraft's side force coefficient due to sideslip and to impact or dynamic pressure and which is inversely proportional to an estimate of the aircraft's wing loading.

16. The aircraft track angle hold control system of claim 1 wherein the automatic control means comprises a command crossfeed from the rudder pedal input to the roll control surfaces.

17. The aircraft track angle hold control system of claim 1 wherein the automatic control means comprises a command crossfeed from a sideslip angle command to the roll control surfaces.

18. An aircraft track angle hold control system comprising:
   a. roll control surfaces capable of generating a rolling moment on the aircraft in flight;
   b. engine-out compensation means using a yaw control surface for countering the yawing moment resulting from a noncenterline engine failure; and
   c. automatic control means for commanding the roll control surfaces to move in such manner as to cause the aircraft's track angle to hold at a substantially constant value, while the engine-out compensation means counters the yawing moment resulting from a noncenterline engine failure using the yaw control surface wherein the automatic control means are functional only when the pilot's roll axis controllers are in a centered detent.

19. The aircraft track angle hold control system of claim 18 wherein the engine-out compensation means comprises pilot application of a rudder pedal input which acts through mechanical control means to position the yaw control surface to generate a yawing moment which counters the yawing moment resulting from the noncenterline engine failure.

20. The aircraft track angle hold control system of claim 18 wherein the engine-out compensation means comprises automatic engine-out control means for sensing the occurrence of the noncenterline engine failure and for positioning the yaw control surface to generate a yawing moment which counters the yawing moment resulting from the noncenterline engine failure.

21. The aircraft track angle hold control system of claim 18 wherein the yaw control surface is a rudder.

22. The aircraft track angle hold control system of claim 18 wherein the automatic control means comprises a command crossfeed from a signal indicative of the amount of yaw control surface position being used by the engine-out compensation means to the roll control surfaces.

23. The aircraft track angle hold control system of claim 18 additionally comprising roll-axis maneuver command control means for causing the aircraft's actual bank angle to at least approximately follow a bank angle command, and wherein the automatic control means comprises a command crossfeed from a signal indicative of the amount of yaw control surface position being used by the engine-out compensation means to a roll angle command bias summing into the bank angle command.

24. The aircraft track angle hold control system of claim 23 wherein the automatic control means further includes a closed-loop track angle hold feedback control law using track angle as a feedback signal, the closed-loop track angle hold feedback control law generating an addition, incremental component to the roll angle command bias summing into the bank angle command.

25. The aircraft track angle hold control system of claim 23 additionally including means for driving the roll angle command bias towards equalling the bank angle command in the steady state.

26. The aircraft track angle hold control system of claim 23 additionally including means for displaying the bank angle command and the roll angle command bias to a pilot of the aircraft.

27. The aircraft track angle hold control system of claim 23 wherein the roll angle command bias is authority limited.

28. The aircraft track angle hold control system of claim 23 wherein the command crossfeed includes a gain value which is directly proportional to the aircraft's side force coefficient due to yaw control surface deflection and to impact or dynamic pressure and which is inversely proportional to an estimate of the aircraft's wing loading.

29. The aircraft track angle hold control system of claim 18 wherein the automatic control means include a closed-loop track angle hold feedback control law using track angle as a feedback signal.

30. An aircraft track rate hold control system comprising:
   a. roll control surfaces capable of generating a rolling moment on the aircraft in flight;
   b. yaw control means for permitting a pilot to command the aircraft to assume a nonzero sideslip condition through a rudder pedal input; and
   c. automatic control means, responsive to a nonzero pilot rudder pedal input, for commanding the roll control surfaces to move in such manner as to cause the aircraft's track rate to hold at a substantially constant value while the pilot makes no roll controller input wherein the automatic control means includes a closed-loop track rate hold feedback control law using a track rate signal as a feedback signal.

31. The aircraft track rate hold control system of claim 30 wherein the yaw control means comprises mechanical control means for the pilot to position a yaw control surface through the rudder pedal input.

32. The aircraft track rate hold control system of claim 30 wherein the yaw control means comprises a maneuver command control system which interprets the rudder pedal input as a sideslip angle command and which uses feedback control means to position a yaw control surface of the aircraft in such manner as to cause the aircraft's actual sideslip angle to at least approximately follow the sideslip angle command.

33. The aircraft track rate hold control system of claim 32 additionally comprising roll-axis maneuver command control means for causing the aircraft's actual bank angle to a least approximately follow a bank angle command, and wherein the automatic control means comprises a command crossfeed from the sideslip angle command to a roll angle bias summing into the bank angle command.

34. The aircraft track rate hold control system of claim 33 wherein the automatic control means further includes a closed-loop track rate hold feedback control law which generates an additional, incremental roll angle command component summing into the roll angle command.

35. The aircraft track rate hold control system of claim 33 wherein the command crossfeed includes a gain value which is directly proportional to the aircraft's side force coefficient due to sideslip and to impact or dynamic pressure and which is inversely proportional to an estimate of the aircraft's wing loading.

36. The aircraft track rate hold control system of claim 30 wherein the automatic control means comprises a command crossfeed from the rudder pedal input to the roll control surfaces.

37. The aircraft track rate hold control system of claim 30 wherein the automatic control means comprises a command crossfeed from a pilot input sideslip angle command to the roll control surfaces.

38. The aircraft track rate hold control system of claim 30 wherein the track rate signal is synthesized from a track angle feedback signal passed through a washout filter.

39. An aircraft track rate hold control system comprising:
 a. roll control surfaces capable of generating a rolling moment on the aircraft in flight;
 b. engine-out compensation means using a yaw control surface for countering the yawing moment resulting from a noncenterline engine failure; and
 c. automatic control means, independent of any ground-based instrument landing system signal, for commanding the roll control surfaces to move in such manner as to cause the aircraft's track rate to hold at a substantially constant value, while the engine-out compensation means counters the yawing moment resulting from a noncenterline engine failure using the yaw control surface.

40. The aircraft track rate hold control system of claim 39 wherein the automatic control means are functional only when the pilot's roll axis controllers are in a centered detent.

41. The aircraft track rate hold control system of claim 39 wherein the automatic control means comprises a command crossfeed from a signal indicative of the amount of yaw control surface position being used by the engine-out compensation means to the roll control surfaces.

42. The aircraft track rate hold control system of claim 39 additionally comprising roll-axis maneuver command control means for causing the aircraft's actual bank angle to at least approximately follow a bank angle command, and wherein the automatic control means comprises a command crossfeed from a signal indicative of the amount of yaw control surface position being used by the engine-out compensation means to a roll angle command bias summing into the bank angle command.

43. The aircraft track rate hold control system of claim 42 wherein the automatic control means further includes a closed-loop track rate hold feedback control law which generates an additional incremental roll angle command component summing into the bank angle command.

44. The aircraft track rate hold control system of claim 42 wherein the command crossfeed includes a gain value which is directly proportional to the aircraft's side force coefficient due to yaw control surface deflection and to impact or dynamic pressure and which is inversely proportional to an estimate of the aircraft's wing loading.

45. The aircraft track rate hold control system of claim 39 wherein the automatic control means includes a closed-loop track rate hold feedback control law using a track rate signal as a feedback signal.

46. A control system for an aircraft, the control system comprising:
 a. yaw input means, which are movable by a pilot of the aircraft, for generating a first command signal which is a function of an input made by the pilot to the yaw input means;
 b. aircraft yawing means for generating a yawing moment on the aircraft in response to the first command signal so as to generate a nonzero sideslip condition while in flight;
 c. means for generating a second command signal for controlling a rolling moment of the aircraft so as to maintain a selected navigation angle of the aircraft while the aircraft is in the nonzero sideslip condition wherein the second command signal generating means includes (1) means for generating a third signal as a function of the first command signal for generating a first rolling moment so as to maintain the selected navigation angle, (2) means for generating a fourth signal as a function of the selected navigation angle for generating a second rolling moment so as to maintain the selected navigation angle, and (3) means for combining the third signal and the fourth signal to generate the second command signal; and
 d. aircraft rolling means for generating a rolling moment on the aircraft while in flight in response to the second command signal.

47. The control system as set forth in claim 46, wherein:
 a. operation of the aircraft in the nonzero sideslip condition generates a second rolling moment on the aircraft; and
 b. the third signal generating means includes means for generating the third signal in a manner to produce the first rolling moment so as to oppose the second rolling moment in a manner to maintain the selected navigation angle.

48. The control system as set forth in claim 47 wherein the selected navigation angle is a selected track angle.

49. The control system as set forth in claim 46 wherein the third signal generating means includes means for generating the third signal as a function of a sideslip angle signal generated as a result of movement of the input means.

50. The control system as set forth in claim 46 wherein the third signal generating means includes
 (1) means for generating a sideslip angle signal as a function of the first command signal, and
 (2) means for generating the third signal as a function of the sideslip angle signal, an impact pressure and wing loading of the aircraft.

51. The control system as set forth in claim 46 wherein:
 a. the control system additionally includes roll input means, which are movable by a pilot of the aircraft, for generating a third command signal which is a function of an input made by the pilot to the roll input means so as to control a rolling moment of the aircraft while in flight and which are movable in a manner than when the roll input means are in a neutral position there is no rolling moment applied to the aircraft; and b. the fourth signal generating means further includes means for generating the fourth signal when the roll input means is in the neutral position and the third command signal reaches a selected threshold value.

52. The control system as set forth in claim 51 wherein the fourth signal generating means further includes
   (1) means for determining an actual track angle of the aircraft and for generating a signal representative thereof, and
   (2) means for responding to the actual track angle signal and for generating the fourth signal as a function of the actual track angle of the aircraft when the roll input means are placed in the neutral position.

53. The control system as set forth in claim 46 additionally comprising equalization means for adjusting the third signal so as to equal the second command signal while at the same time reducing the fourth signal to zero.

54. The control system as set forth in claim 46 additionally comprising:
   a. means for detecting a yawing moment of the aircraft due to an engine failure; and
   b. means for generating the first command signal in response to the yawing moment so as to cause the aircraft yawing means to generate a yawing moment which opposes the yawing moment generated due to the engine failure.

55. The control system as set forth in claim 54 wherein the selected direction of travel is a selected track angle.

56. The control system as set forth in claim 54 wherein the selected direction of travel is a selected track rate.

57. A control system for an aircraft, the control system comprising:
   a. yaw input means, which are movable by a pilot of the aircraft, for generating a first command signal which is a function of an input made by the pilot to the yaw input means;
   b. aircraft yawing means for generating a yawing moment on the aircraft in response to the first command signal so as to generate a nonzero sideslip condition while in flight;
   c. means for measuring the pilot input;
   d. means for generating a second command signal, as a function of the measured pilot input to the yaw means, for controlling a rolling moment of the aircraft so as to maintain a selected direction of travel of the aircraft while the aircraft is in the nonzero sideslip condition; and
   e. aircraft rolling means for generating a rolling moment on the aircraft while in flight in response to the second command signal.

58. A control system for an aircraft, the control system comprising:
   a. yaw input means for generating a first command signal;
   b. aircraft yawing means for generating a yawing moment on the aircraft in response to the first command signal so as to generate a nonzero sideslip condition while in flight;
   c. means for generating a second command signal, as a function of first and second output signals, for controlling a rolling moment of the aircraft so as to maintain a selected direction of flight of the aircraft while the aircraft is in the nonzero sideslip condition, the second command signal generating means including (1) means for generating the first output signal as a function of the first command signal, (2) means for generating the second output signal as a function of the selected direction of travel; and
   d. aircraft rolling means for generating a rolling moment on the aircraft while in flight in response to the second command signal.

59. An aircraft track angle hold control subsystem comprising:
   a. roll control surfaces capable of generating a rolling moment on said aircraft in flight;
   b. engine-out compensation means using a yaw control surface for countering the yawing moment resulting from a noncenterline engine failure; and
   c. automatic control means for commanding the roll control surfaces to move in such manner as to cause the aircraft's track angle to hold at a substantially constant value, while the engine-out compensation means counters the yawing moment resulting from a noncenterline engine failure using the yaw control surface wherein the automatic control means comprises a command crossfeed from a signal indicative of the amount of yaw control surface position being used by the engine-out compensation means to the roll control surfaces.

60. A track angle hold control system comprising:
   a. roll control surfaces capable of generating a rolling moment on said aircraft in flight;
   b. engine-out compensation means using a yaw control surface for countering the yawing moment resulting from a noncenterline engine failure; and
   c. automatic control means for commanding the roll control surfaces to move in such manner as to cause the aircraft's track angle to hold at a substantially constant value, while the engine-out compensation means counters the yawing moment resulting from a noncenterline engine failure using the yaw control surface wherein the automatic control means include a closed-loop track angle hold feedback control law using track angle as a feedback signal.
   c. means for generating a second command signal, as a function of the input made by the pilot to the yaw input means, for controlling a rolling moment of the aircraft so as to maintain a selected navigation angle of the aircraft while the aircraft is in the nonzero sideslip condition, the second command signal generating means including (1) means for generating a third signal as a function of the first command signal for generating a first rolling moment so as to maintain the selected navigation angle, (2) means for navigation angle for generating a second rolling moment so as to maintain the selected navigation angle, and (3) means for combining the third signal and the fourth signal to generate the second command signal; and
   d. aircraft rolling means for generating a rolling moment on the aircraft while in flight in response to the second command signal.

61. An aircraft track angle hold control system comprising:
   a. roll control surfaces capable of generating a rolling moment on the aircraft in flight;
   b. yaw control means for permitting a pilot to command the aircraft to assume a nonzero sideslip condition through a rudder pedal input; and c. automatic control means, responsive to a nonzero pilot rudder pedal input and independent of any ground-based instrument landing system signal, for commanding the roll control surfaces to move in such manner as to cause the aircraft's track angle to hold at a substantially constant value while the pilot makes no roll controller input.

62. An aircraft track angle hold control system comprising:
  a. roll control surfaces capable of generating a rolling moment on said aircraft in flight;
  b. engine-out compensation means using a yaw control surface for countering the yawing moment resulting from a noncenterline engine failure; and
  c. automatic control means, independent of any ground-based instrument landing system signal, for commanding the roll control surfaces to move in such manner as to cause the aircraft's track angle to hold at a substantially constant value, while the engine-out compensation means counters the yawing moment resulting from a noncenterline engine failure using the yaw control surface.

63. An aircraft track rate hold control system comprising:
  a. roll control surfaces capable of generating a rolling moment on said aircraft in flight;
  b. yaw control means for permitting a pilot to command the aircraft to assume a nonzero sideslip condition through a rudder pedal input; and
  c. automatic control means, responsive to a nonzero pilot rudder pedal input and independent of any ground-based instrument landing system signal, for commanding the roll control surfaces to move in such manner as to cause the aircraft's track rate to hold at a substantially constant value while the pilot makes no roll controller input.

* * * * *